United States Patent Office 3,431,436
Patented Mar. 4, 1969

3,431,436
CONTROL RECTIFIER CIRCUIT INCLUDING AN ARRANGEMENT FOR RENDERING A CONTROLLABLE RECTIFIER NON-CONDUCTING
Kenneth G. King, London, England, assignor to Westinghouse Brake and Signal Company, Limited, London, England
Filed Aug. 12, 1965, Ser. No. 479,264
Claims priority, application Great Britain, Sept. 28, 1964, 39,363/64
U.S. Cl. 307—252　　　　　　　　　　　9 Claims
Int. Cl. H03k 17/60

ABSTRACT OF THE DISCLOSURE

A controllable rectifier circuit including a controllable rectifier device having a forward blocking capability in a current path from a source to a load such that the device can be rendered conducting in the forward condition by a triggering signal applied thereto. The circuit further includes a commutating capacitor connectable in a given charged condition via switch means across the said path of the controllable rectifier to render the controllable rectifier non-conducting and temporarily to provide an alternate path for current flow. The circuit further includes a saturable reactor winding connected in series with the controllable rectifier device to temporarily hold back from the device a swing of voltage on the capacitor on acquiring an oppositely charged condition due to the said current flow.

---

This invention relates to controllable rectifier circuits and relates particularly to the means whereby a controllable rectifier, once conducting, is rendered non-conducting.

In semi-conductor controllable rectifier circuits it has already become known to render a controllable rectifier non-conducting by connecting a charged capacitor across it such that the current to a load being supplied by the controllable rectifier device is then drawn largely from the capacitor for sufficient time for the controllable rectifier device to attain its non-conducting condition. Various means have been proposed for re-establishing the charge on the capacitor but this is not relevant to the present invention. It will be appreciated, however, that the size of the capacitor used, is assuming an optimum charged voltage, dependent upon the turn-off time of the controllable rectifier device.

According to the present invention there is provided a controllable rectifier circuit employing a commutating capacitor with associated switching means for connecting the capacitor in a path in parallel with a current path through a controllable rectifier device in the circuit with such polarity of charge as to cause a switch of current from the controllable rectifier device to cause the latter to revert from its conducting to its non-conducting condition, blocking means being provided in series with the controllable rectifier device for holding back the application of a subsequent reverse voltage swing on said capacitor from the controllable rectifier device.

It will be understood that by virtue of the said blocking means, ideally the controllable rectifier device may, for a given size of commutating capacitor, have twice the turn-off time which is permissible in the absence thereof. Consequently, the size of the capacitor for a given device turn-off time may ideally be halved.

However, by virtue of circuit imperfections and side effects, it may be found in practice that the turn-off time provided by a given capacitor although substantially increased, may not in fact be doubled. Thus although the circuit turn-off time may be nearly doubled, this may not in practice lead to an improvement by a factor of two as the turn-off time for any given controllable rectifier may not remain constant.

Figure 1:
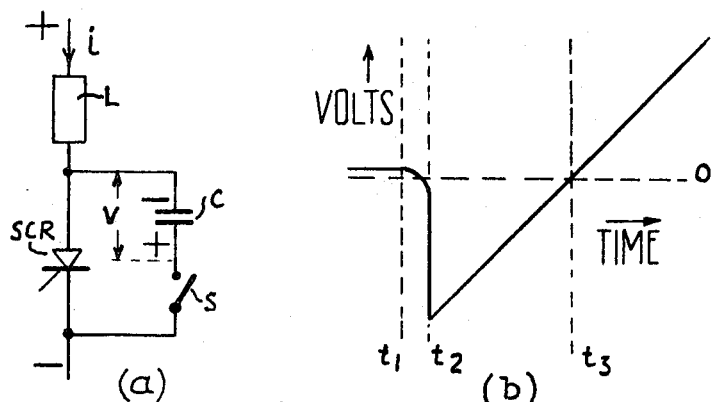
Figure 2:
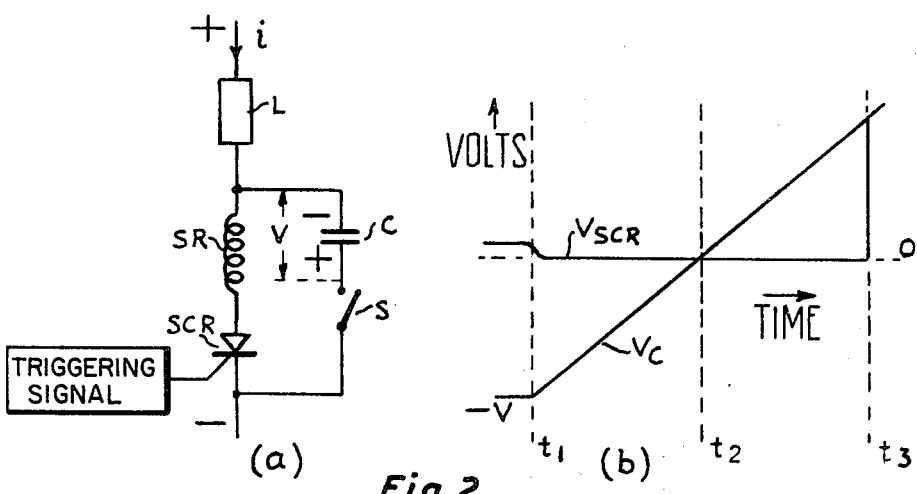
Figure 3:
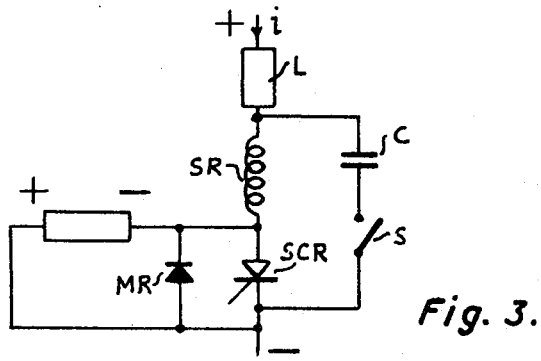
Figure 4:
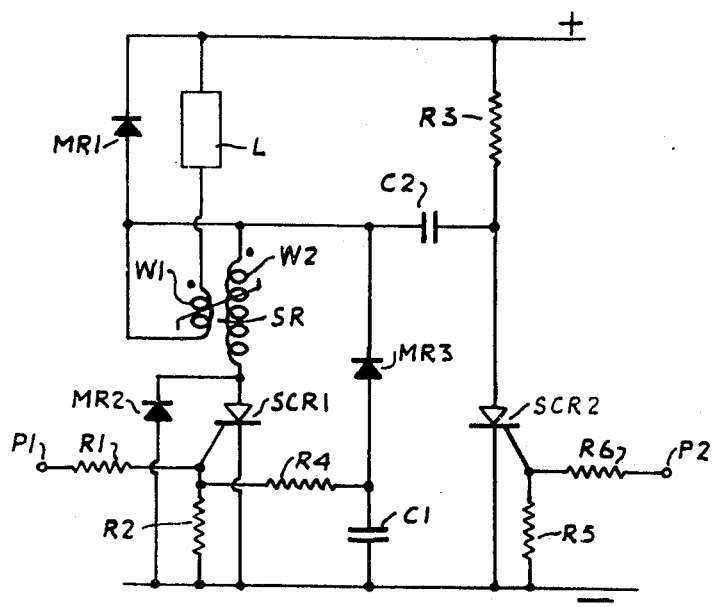

In order that the present invention may be clearly understood and readily carried into effect, the same will be further described, by way of example only with reference to the accompanying drawings, in which FIG. 1 at (a), shows a simplified known form of circuit and at (b) illustrates a wave-form to be considered in the operation thereof, FIG. 2 at (a), shows a simplified circuit illustrative of the invention and at (b) illustrates a waveform to be considered in connection with the operation thereof, FIG. 3 illustrates a modification of the circuit arrangement shown in FIG. 2(a), and FIG. 4 illustrates a chopper circuit employing the invention.

Referring to FIG. 1, which illustrates a well-known form of commutation arrangement for a controllable rectifier device SCR which governs the supply of current to a load L connected in series therewith, the controllable rectifier device is a device of the type which is rendered conducting on application of a triggering signal to the gating electrode thereof and is rendered non-conducting when the current therein tends to reverse. For the purposes of causing the current to tend to reverse in SCR to render the latter non-conducting, a capacitor C, which is assumed to be initially charged to a voltage $-V$ is provided, switchable across the controllable rectifier device by a switch S. The voltage across the controllable rectifier device when the switch S is closed is illustrated by the waveform shown in FIG. 1(b). The switch S is closed at $t_1$, the period $t_1$ to $t_2$ is the reverse recovery period during which the capacitor C loses a charge approximately proportional to the load current $i$ and at $t_2$, the controllable rectifier device blocks in the reverse direction and the capacitor discharges at a rate depending upon the load current during the forward recovery period $t_2$ to $t_3$ during which the device regains its independent forward blocking capability. If the stored charge on the capacitor C is $t_s$ microcoulombs/ampere and the forward recovery time is $t_{fr}$ microseconds, $$CV = it_s + \int_{t_2}^{t_3} i\,dt \qquad (1)$$

or if as is usual due to load inductance it is substantially constant over the interval concerned, $$CV = i(t_s + t_{fr})$$

or $$t_{off} = \frac{CV}{i} \qquad (2)$$

Referring now to the circuit arrangement of FIG. 2, it will be observed that included in series with the controllable rectifier device SCR and between the connections across which the capacitor is connected on closure of switch S, there is provided blocking means comprising a small saturable reactor SR. For the purposes of the present immediate description it is assumed that SR is a perfect saturable reactor having substantially zero magnetising current. In operation of the arrangement, with a load current $i$ flowing through the controllable rectifier device SCR, the saturable reactor SR is saturated in the forward direction and the capacitor C is assumed to be charged as before to a voltage of $-V$ volts. On the switch S being closed to initiate turn-off of the controllable rectifier device SCR, the voltage on the capacitor C is presented across the saturable reactor SR and the flux in the core of the saturable reactor changed reversewise at a rate which depends upon the voltage and, further, capacitor C discharges at a rate depending upon the value of the load current $i$. It will be appreciated here that it is assumed that the controllable rectifier device has a certain leakage current. Assuming moreover the load current $i$ to be substantially constant, the capacitor C arrives at its substantially discharged state at an instant $t_2$ after an interval of $CV/i$ during which SCR must have attained its non-conducting condition. The voltages across the controllable rectifier device SCR and the commutating capacitor C following closure of the switch S, are shown in FIG. 2(b). At the instant $t_2$, at which C is discharged to zero charge, the flux in the saturable reactor SR attains its maximum reverse excursion and assuming that reverse saturation does not occur, this corresponds to a voltage time integral applied by the capacitor from $t_1$ to $t_2$ in FIG. 2(b). After the instant $t_2$, the voltage on the commutating capacitor C begins to acquire a positive value but again because the saturable reactor SR is unsaturated in the forward direction at this time, ideally this voltage appears across the saturable reactor and not across the controllable rectifier device. This state of affairs continues for increasing reverse charge swing on the capacitor C until SR is again saturated in the forward direction as at the start which condition is attained at the point $t_3$ after a further voltage time integral equal to that from $t_1$ to $t_2$ but of opposite sign thereto, assuming that the load current $i$ is constant. Hence, the total turn-off time available for the controllable rectifier device in this circuit arrangement is ideally $$2\frac{CV}{i}$$

namely twice that provided by the circuit arrangement of FIGURE 1 for the same values of circuit components.

As may have been foreseen, in the foregoing discussion of the circuit arrangement of FIG. 2 certain assumptions have been made which may, from a practical point of view, not be valid. Firstly, the saturable reactor SR may, in practice, have a not insignificant magnetising current in the unsaturated condition and therefore, it neither absorbs the whole of the reverse voltage on the condenser during the resetting period $t_1$ to $t_2$ nor does it block the whole of the positive increasing voltage on the capacitor C from the controllable rectifier device during the period $t_2$ to $t_3$. Again, at the instant $t_3$ of FIGURE 2(b) sudden saturation of the saturable reactor causes a very high rate of rise of voltage to be applied to the controllable rectifier device. Thirdly, the physical turn-off time for the controllable rectifier device in the circuit arrangement of FIG. 2 is not necessarily the same as that when it is employed in the circuit arrangement of FIG. 1.

The effects of negative magnetising current which may be present in the interval from $t_1$ to $t_2$ may be readily countered by connecting a small diode such as MR in inverse parallel relationship with the controllable rectifier device SCR as shown in FIG. 3. FIG. 3 also provides a source of a small negative voltage which is connected across the controllable rectifier device during the whole of the turn-off period $t_1$ to $t_3$. This may be arranged to counter the effect of positive magnetising current occurring in the period $t_2$ to $t_3$. The bias source is of relatively high impedance and is not intended to produce a reverse voltage as such across the controllable rectifier device. It does however prevent the anode voltage of the latter from becoming positive as a result of the magnetising current flowing in SR. The diode MR thus carries the difference between the bias current and the saturable reactor magnetising current and maintains approximately 1 volt across the controllable rectifier SCR.

As will be seen hereafter in the description of FIG. 4, the effects of the positive magnetising current in the interval $t_2$ to $t_3$ may be countered in another manner by providing a separate bias winding on the saturable reactor. Other methods may also be envisaged by those skilled in the art, for example, the magnetising current may be absorbed by a resistor which limits the voltage developed across the controllable rectifier device to a low level, although this method may not be very useful in practice as the resistance is required to be so low that it passes an inconveniently large current when the controllable rectifier device is non-conducting. Again, in another method the controllable rectifier device may be shunted by a constant current circuit, which again may not be very useful from a practical point of view as the appreciable forward voltage which remains across the controllable rectifier device is a disadvantage.

Referring to the practical D.C. chopper circuit shown in the illustration of FIG. 4, the load L is connected between the D.C. supply lines via the small biassing winding W1, and the main winding W2 of the saturable reactor SR and the controllable rectifier device SCR1. A diode MR1 is connected between the junction of W1 and W2 and the positive D.C. supply terminal and is poled oppositely to the direction of flow of normal load current. In parallel moreover with SCR there is provided a further diode MR2 in reverse relationship therewith. A commutating capacitor C2 is switchable via a switching device in the form of a further controllable rectifier device SCR2 across the series combination of the winding W2 of SR and SCR itself. C2 is chargeable via a resistor R3 connected between the junction C2 and SCR2 to the positive supply line. Further, the gating electrode of SCR1 is provided with biassing components R4, C1 and MR3 such as to provide a negative bias to counteract the prolongation effects on the turn-off time of SCR1 which results from the limited reverse anode voltage which may be caused by the parallel diode MR2. The "on" input terminal P1 of the circuit is connected via a potential divider formed of resistors R1 and R2 to the gating electrode of SCR1 and the "off" terminal P2 of the circuit is connected via a potential divider comprising resistors R6 and R5 to the gating electrode of SCR2.

The manner of operation of the circuit arrangement of FIG. 4 will be readily apparent from the previous discussion, the capacitor C2 being switched across the series arrangement of SR and SCR1 when a triggering pulse is applied at P2 to render SCR2 conducting. The turn-off time available for the controllable rectifier device SCR1 is then that corresponding to the interval $t_1$ to $t_3$ shown in FIGURE 2(b) occupied by the load circuit to draw current from the capacitor C2 such that its charge reverses. The winding W1 which is connected in series with the winding W2 of the saturable reactor is such as to provide, as mentioned earlier, the requisite bias on the saturable reactor to overcome the effect of magnetising current during the interval $t_2$ to $t_3$ when the charge of C2 is increasing positively on its upper plate as shown in FIG. 2(b). The diode MR2 counteracts the magnetising current which would otherwise be present in the preceding interval following turn-off of SCR2 when the charge on C2 is descending towards zero.

Although not shown in FIGURE 4, a forward biassing source such as that of FIGURE 3 may be connected, if desired, across the diode MR2.

In the circuit arrangement of FIG. 4, it may be that for sufficiently high operating voltages the capability of the controllable rectifier device SCR1 to withstand high rates of rise of applied voltage may be insufficient and although the negative gate electrode bias which is provided increases this capability, it may well be desirable to employ suitable suppression means.

Although the invention has been described in relation to a chopping circuit, the invention is not limited to such a circuit and may be employed in other forms of controllable rectifier circuits, especially inverters. In certain inverter circuits, diodes are connected already in parallel with the controllable rectifier devices in inverse parallel relationship therewith for other purposes. In such a circuit the increase in turn-off time for any given device is due to a parallel diode already present so that by virtue of the invention the provision of means in the form of a saturable reactor to operate in the manner described to hold back from the controllable rectifier device the reverse voltage swing of the commutating capacitor, should enable a substantial unqualified improvement in that the commutating capacitances may be reduced.

Having thus described my invention what I claim is:

1. A controllable rectifier circuit including a controllable rectifier device having a forward blocking capability in a current path from a source to a load such that the device can be rendered conducting in the forward direction by a triggering signal applied thereto, a forced commutating circuit including a commutating capacitor and a switching means for connecting the capacitor in a given charged condition across said device between the source and the load for rendering the device non-conducting and temporarily providing an alternate path for current flow to the load which would otherwise flow through the device and a saturable reactor winding means connected in said circuit in series with said device for temporarily holding back from said device a swing of voltage on the said capacitor on acquiring a charged condition opposite to the said given charged condition due to the said current flow.

2. A controllable rectifier circuit as claimed in claim 1, said capacitor being connectable via said switch means across the device and the saturable reactor in series.

3. A controllable rectifier circuit as claimed in claim 1, the device being a semi-conductor device.

4. A controllable rectifier circuit as claimed in claim 1, a unidirectionally conductive device being connected in inverse parallel relationship with the controllable rectifier device so that no more than the voltage drop across the unidirectionally conductive device appears across the controllable rectifier device during discharge of the capacitor notwithstanding magnetizing current in the saturable reactor.

5. A controllable rectifier circuit as claimed in claim 4, a source of forward biasing potential being connected across said unidirectionally conductive device.

6. A controllable rectifier circuit as claimed in claim 1, said saturable reactor including a further winding in series with the said winding, said further winding being reversely wound to tend to compensate for reverse voltage which tends to appear across the controllable rectifier device due to magnetizing current in the saturable reactor during a swing of voltage on the capacitor towards a charged condition opposite to said given condition.

7. A controllable rectifier circuit as claimed in claim 1, including circuit means for applying a standing bias to the gating electrode of the controllable rectifier device of such polarity as to tend to reduce the turn-off time of the device.

8. A controllable rectifier circuit as claimed in claim 1, said commutating capacitor having one terminal connected via a resistor to a terminal of a D.C. source for the circuit and the other terminal being connected via the controllable rectifier device to the other terminal of the source such as to provide for the recharging of the capacitor during conducting period of the device.

9. A controllable rectifier circuit as claimed in claim 1, said switching means comprising a further controllable rectifier device.

References Cited

UNITED STATES PATENTS

| | | | |
|---|---|---|---|
| 3,244,904 | 4/1966 | Schwartz | 307—88.5 |
| 2,773,184 | 12/1956 | Rolf | 307—88.5 XR |
| 3,015,739 | 1/1962 | Manteuffel | 307—88.5 |
| 3,303,385 | 2/1967 | Staiger | 315—206 |

OTHER REFERENCES

Electronics, "Power and Control Circuits" by Von Zastrow dated Dec. 6, 1963, pp. 54 and 56 and FIG. 4 relied on.

ARTHUR GAUSS, *Primary Examiner.*

S. D. MILLER, *Assistant Examiner.*

U.S. Cl. X.R.

307—240, 246, 284, 305, 314